United States Patent
Oda

(10) Patent No.: US 6,951,202 B2
(45) Date of Patent: Oct. 4, 2005

(54) KNOCKING CONTROL SYSTEM AND METHOD FOR INTERNAL COMBUSTION ENGINE USING MULTIPLE FUELS

(75) Inventor: Tomihisa Oda, Numazu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/976,043

(22) Filed: Oct. 29, 2004

(65) Prior Publication Data

US 2005/0109316 A1 May 26, 2005

(30) Foreign Application Priority Data

Nov. 26, 2003 (JP) ........................................ 2003-395699

(51) Int. Cl.$^7$ .............................................. F02D 43/00
(52) U.S. Cl. ................... 123/406.29; 123/299; 123/305
(58) Field of Search .......................... 123/406.29, 299, 123/304, 305, 1 A; 701/103, 111

(56) References Cited

U.S. PATENT DOCUMENTS 6,711,893 B2 * 3/2004 Ueda et al. .................... 60/285

FOREIGN PATENT DOCUMENTS

| JP | 2000-154771 | 6/2000 |
|---|---|---|
| JP | 2001-50070 | 2/2001 |
| JP | 2001-193525 | 7/2001 |
| JP | 2003-120386 | 4/2003 |
| WO | WO 2004/111416 A1 | 12/2004 |

* cited by examiner

*Primary Examiner*—Hai Huynh
(74) *Attorney, Agent, or Firm*—Oliff & Berridge, PLC

(57) ABSTRACT

High octane fuel and low octane fuel are supplied into the combustion chamber of an engine from high-octane fuel tank and low octane fuel tank via a high octane fuel injector and a low octane fuel injector. During a knocking control, if the quantity of high and low octane fuels in the respective tanks has been unbalanced, the supply ratio between high octane fuel and low octane fuel is changed 1 to control a knocking occurring in the engine without changing the ignition timing.

9 Claims, 4 Drawing Sheets

KNOCKING CONTROL SYSTEM AND METHOD FOR INTERNAL COMBUSTION ENGINE USING MULTIPLE FUELS

INCORPORATION BY REFERENCE

The disclosure of Japanese Patent Application No. 2003-395699 filed on Nov. 26, 2003 including the specification, drawings and abstract is incorporated herein by reference in its entirety.

BACKGROUND OF THE INVENTION

1. Field of the Invention

The invention generally relates to a knocking control system and method for an internal combustion engine running on multiple fuels, and more particularly, relates to the knocking control system or method for an internal combustion engine running on multiple fuels having a different octane rating and supplied at a desired ratio.

2. Description of the Related Art

Known in the art is a knocking control system which prevents or stops a knocking in an internal combustion engine during, for example, an increased load operation. The knocking control system uses a knock sensor or an in-cylinder pressure sensor embedded in the cylinder block of the internal combustion engine to detect the amplitude of the engine vibration having a frequency specific to a knocking of the engine. When a knocking is detected, the knocking control system retards the ignition timing in accordance with the detected amplitude, i.e., the intensity of the knocking, so as to prevent or stop it.

Also, Japanese Laid-opened Patent Application No. 2001-50070 recites an internal combustion engine having a fuel supply system capable of supplying two or more different fuels, such as for example high octane gasoline and low-octane gasoline, at a desired ratio. This fuel supply ratio is changed depending on particular conditions while the engine is running so that the octane rating of the entire fuel supplied to the engine changes accordingly. With this system, for example, it is possible to prevent or stop a knocking of the engine by increasing the quantity of high octane gasoline under an engine operating state typically causing a knocking.

Also, another control system executing a similar fuel control has been shown in Japanese Laid-opened Patent Application No. 2003-120386. The control system supplies an engine with multiple fuels each having a different calorific value at a desired ratio, and when a knocking occurs, it suppresses the knocking by adjusting either the fuel supply ratio or the ignition timing appropriately.

Although JP-A-2003-120386 recites changing one of the fuel supply ratio and the ignition timing to suppress a knocking, it shows no description regarding a criteria for selection between changing the fuel supply ratio and changing the ignition timing.

Meanwhile, in a multiple-fuel engine as mentioned above, each fuel may either be supplied from a separate fuel tank which is provided in the vehicle and filled up from the outside, or produced by separating ordinary fuel into two or more fuels having a different property (e.g., octane rating) by means of a separating device provided in the vehicle. However, it is to be understood that each fuel is differently consumed and the quantity balance between the fuels is easily lost in many cases.

If fuels are supplied from the respective fuel tanks which are filled up from the outside, the aforementioned unbalanced fuel consumption may result in, for example, one of the tanks being emptied while much fuel is left in the other. In this case, it will be necessary to fill the empty tank despite the fact that there is much fuel left in the vehicle, making the refueling of the vehicle complex and burdensome.

On the other hand, when the fuels are produced by separating ordinary fuel using the in-vehicle separating device, production of the fuels continues as long as the device is running, and therefore, if the fuels are consumed unevenly, it may cause a problem that the less consumed fuel rapidly increases and fills up its tank, stopping the operation of the in-vehicle separating device.

To prevent such a problem, when an unbalanced consumption of the fuels occurs, it is necessary to equalize the remaining quantity of each fuel by increasing the consumption of one of the fuels which is larger in amount than the other.

Thus, JP-A-2003-120386 only recites changing one of the fuel supply ratio and the ignition timing to prevent a knocking, but neither shows a criteria for selection between said ratio and timing nor proposes balancing the consumption of each fuel.

SUMMARY OF THE INVENTION

It is one object of the invention to provide knocking control system and method for an internal combustion engine using multiple fuels, which are able to prevent or stop a knocking while maintaining a desired fuel quantity balance between said fuels.

To accomplish this object, a first aspect of the invention relates to a knocking control system for an internal combustion engine, comprising fuel supply means for supplying the internal combustion engine with a first fuel and a second fuel with a different octane rating from the first fuel, and controlling means performing a knocking control to control a knocking occurring in the internal combustion engine. The controlling means obtains a requested ignition timing during the knocking control; and obtains a remaining quantity of the first fuel and the second fuel; and selects and changes one of an ignition timing and a fuel supply ratio between the first and second fuels, based on the requested ignition timing and the remaining quantity of the first and second fuels.

Also, a second aspect of the invention relates to a method for performing a knocking control to control a knocking in an internal combustion engine running on a first fuel and a second fuel with a different octane rating from the first fuel. This method comprises; obtaining a requested ignition timing during the knocking control; obtaining a remaining quantity of the first fuel and the second fuel; and selecting and changing one of an ignition timing and a fuel supply ratio between the first and second fuels, the selection being made based on the requested ignition timing and the remaining quantity of the first and second fuels.

According to the knocking control system and method described above, when the ignition timing is to be changed to prevent or stop a knocking, the controlling means determines whether to change the ignition timing or the fuel supply ratio between the first and second fuels, based on the requested ignition timing and the remaining quantity of each fuel. For example, when the ignition timing is to be changed where the remaining quantity of the fuel with a high octane rating is larger than the other with a low octane rating, the controlling means then increases the supply ratio of the high octane fuel, instead of changing the ignition timing, in order to prevent or stop a knocking. Thus, it is possible to improve the balance of fuel quantity as well as preventing or stopping a knocking.

Accordingly, the above-described knocking control system and method make it possible to prevent both a knocking in the internal combustion engine and a large difference between the quantities of the first and second fuels.

BRIEF DESCRIPTION OF THE DRAWINGS

The foregoing and/or further objects, features and advantages of the invention will become more apparent from the following description of preferred embodiment with reference to the accompanying drawings, in which like numerals are used to represent like elements and wherein.

DETAILED DESCRIPTION OF THE PREFERRED EMBODIMENTS

Figure 1:
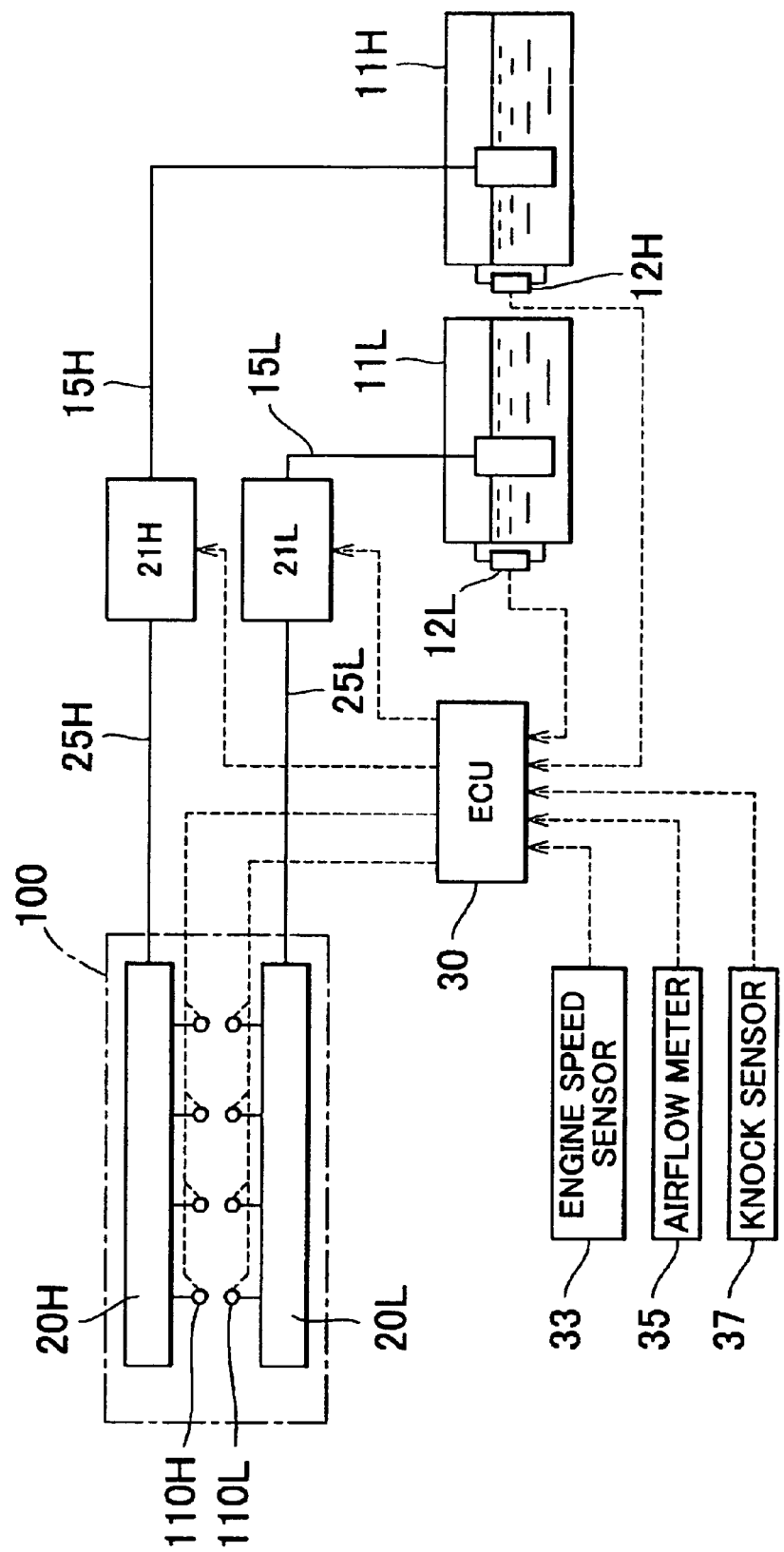
FIG. 1 is a view schematically showing the configuration of an internal combustion engine incorporating a knocking control system according to one exemplary embodiment of the invention.

Hereinafter, an exemplary embodiment of the invention will be explained with reference to the accompanying drawings. FIG. 1 shows the configuration of a vehicular internal combustion engine incorporating a knocking control system according to a first exemplary embodiment of the invention.

Referring to FIG. 1, 100 denotes an internal combustion gasoline engine, and 110H and 110L denote injectors each provided to a corresponding cylinder and arranged to inject fuel, i.e., gasoline, into said cylinder directly. One injector 110H and one injector 110L are provided to each cylinder. Thus, because the internal combustion engine 100 has four cylinders, there are a total of 8 injectors.

The injectors 110H are supplied with high octane fuel (high octane gasoline) and serve as high octane fuel injectors, and the 110L are supplied with low octane fuel (low octane gasoline) and serve as low-octane fuel injectors. The injectors 110H are connected to a delivery pipe 20H and supplied with high octane fuel therefrom and the injectors 110L are connected to a delivery pipe 20L and supplied with low-octane fuel therefrom.

While in this exemplary embodiment each cylinder is provided with two injectors 110H and 110L, each cylinder may instead be provided with one injector connected to both the delivery pipes 20H and 20L and supplied with high octane fuel and low octane fuel and mixing the fuels up at a specific ratio before injection.

Also, one or both of the injectors 110H and 110L may be a conventional port-injection type injector provided in the intake port for each cylinder.

Back to FIG. 1, 11H denotes a high octane fuel tank, 11L a low-octane fuel tank. In this embodiment, two fuels are injected into each cylinder via the injectors 110H and 110L, and accordingly two separate tanks 11*h*, 11L containing high and low octane fuels are provided. While in this embodiment "multiple fuels" comprise high octane gasoline and low octane gasoline, they may instead comprise gasoline and other liquid fuel.

Also, while in this embodiment the high and low octane fuels are supplied to the fuel tanks 11H, 11L from the outside, they may be produced by separating ordinary fuel into fuels having different octane ratings by means of a separation film, or the like, in the vehicle.

Fuel pumps 21H and 21L are provided which pump up high and low octane fuels from the fuel tanks 11H, 11L and send them by pressure to the injectors 110H, 110L via the fuel pipes 25H, 25L.

In this way, in the exemplary embodiment, high octane fuel and low octane fuels are delivered to the respective cylinders of the internal combustion engine 100 through separate fuel supply lines, and therefore it is possible to change the ratio between the supplied quantity of high octane fuel and that of low octane fuel (will be referred to as "high-low octane fuel supply ratio") by controlling the injection quantity of each injector 110H or 110L appropriately.

Back to FIG. 1, 30 denotes an ECU (Electronic Control Unit) 30 which is a conventional microcomputer device including a ROM (Read Only Memory), RAM (Random Access Memory), CPU (Central Processing Unit), input and output ports, all of which are connected via bidirectional bus. The ECU 30 performs, as well as a basic control for fuel injection quantity to each cylinder, the setting of the high-low octane fuel supply ratio and the actions of retarding the ignition timing and changing the high-low octane fuel supply ratio in response to a knocking occurring in the internal combustion engine 100 in order to prevent or stop it.

The ECU 30 is connected through the output port to the injectors 110H, 110L for injection quantity control and spark plugs via ignition circuits, both not shown, for ignition timing control. Meanwhile, the ECU 30 receives via the input port the signals indicative of the remaining fuel quantify in each fuel tank from fuel quantity sensors 12H, 12L, engine speed from an engine speed sensor 33, intake amount from an airflow meter 35, and a knock signal (indicating amplitude of vibration specific to a knocking) from a knock sensor 37, respectively. As the knock sensor 37, for example, a vibration sensor detecting vibration of the cylinder block of the internal combustion engine 100 or an in-cylinder pressure sensor detecting the internal pressure of a cylinder may be used.

In operation, the ECU 30 sets the total quantity of fuel (high and low octane fuels) and the high-low octane fuel supply ratio on the basis of a relationship obtained in advance with respect to engine load conditions, such as for example intake amount and engine speed per revolution of the crank shaft. During high engine load condition, the ECU 30 increases the supply ratio of high octane fuel so that the octane ranting of the entire fuel increases accordingly, allowing the engine output to be increased by advancing the ignition timing to the vicinity of the maximum output point.

However, since the high and low octane fuels are separately stored in the fuel tanks 11H and 11L, when an engine operation mode in which the consumption of one of the fuels is larger than the other continues, the remaining quantity of the high and low octane fuels will be unbalanced.

Such an unbalanced use of fuels results in one of the fuel tanks 11H, 11L being emptied while much fuel is left in the other, and it will be necessary to fill the empty tank, making the refilling of the vehicle more frequent and complicated.

This problem also holds true when high and low octane fuels are produced by separating ordinary fuel in the vehicle. In this case, more specifically, when unbalanced use of fuels continues, the remaining quantity of the less consumed fuel increases and ends up filling up a corresponding one of the fuel tanks so that the separation of fuel must be stopped since no more space is left in said tank.

To counter this, in this exemplary embodiment, the remaining fuel quantity balance is adjusted through a knocking control, as will be described in detail below.

The ECU 30 monitors the vibration of the cylinder block or the in-cylinder pressure using the knock sensor 37, and detects the vibration amplitude of a frequency specific to a knocking (knocking intensity). When detecting the knocking intensity exceeding a threshold, the ECU 30 determines that a knocking is occurring, and performs an action of preventing or stopping the knocking according to knocking intensity detected.

As is known in the art, a knocking is typically caused by early ignition of fuel, so when it is determined that a knocking is occurring while the engine load is increasing, such as during acceleration, the ECU 30 retards the ignition timing accordingly to prevent or stop the knocking. The higher the knocking intensity, the more the ignition timing is retarded.

In the exemplary embodiment, when it is determined that a knocking is occurring where the remaining quantity of high octane fuel is larger than low octane fuel, the ECU 30 increases the supply ratio of high octane fuel without retarding the ignition timing, and accordingly the octane rating of the entire fuel increases so that the ignition timing of an air-fuel mixture in the combustion chamber returns to normal, as it does when the ignition timing is retarded. In this method, it is possible to both adjust the balance of the remaining fuel quantity and prevent or stop the knocking.

Meanwhile, when a knocking has been prevented or stopped by retarding the ignition timing, the ignition timing is then advanced towards the optimum ignition point set based on engine operating conditions to a proper value within a range causing no knockings. At this time, however, if the remaining quantity of low octane fuel is larger than high octane fuel, the ECU 30 increases the supply quantity of low octane fuel without advancing the ignition timing. Thus, it is possible to improve the balance of the remaining fuel quantity without causing a knocking.

Figure 2:
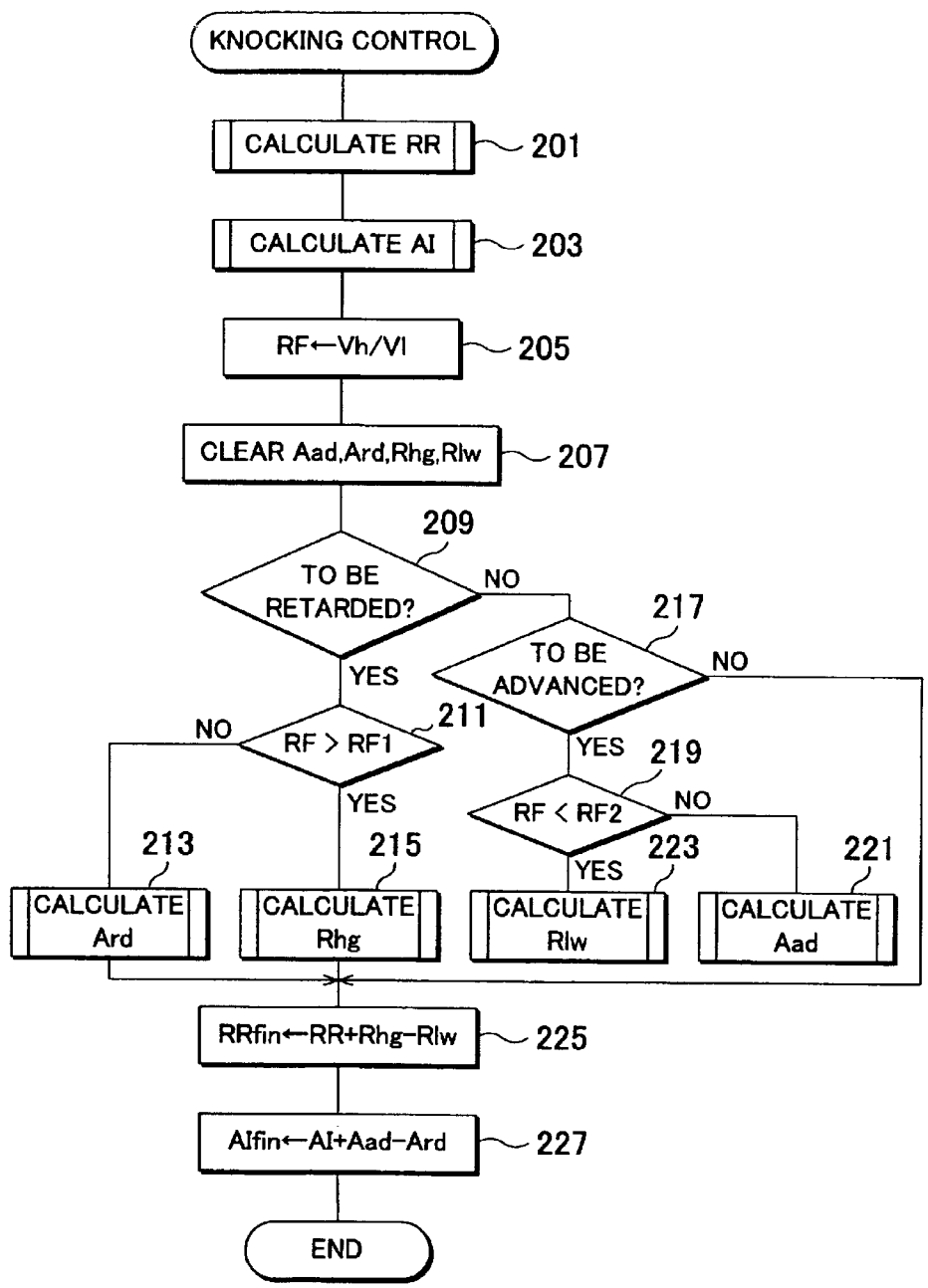
FIG. 2 is a flowchart representing one exemplary routine executed to control a knocking in the internal combustion engine shown in FIG. 1.

FIG. 2 is a flowchart representing a knocking control routine that the ECU 30 executes at prescribed time intervals.

Referring to FIG. 2, the ECU 30 obtains in step 201 a high-low octane fuel supply ratio RR, which is defined as, for example, the ratio of high octane fuel quantity to the entire fuel quantity. This ratio RR is found in advance by experiments with respect to engine operating conditions, i.e., engine speed and engine load, and is preliminarily stored in the ROM of the ECU 30 in the form of a two-dimensional map using engine speed and engine load as parameters. The engine load is defined from, for example, intake amount per revolution of the crank shaft of the internal combustion engine 100. Thus, in Step 201, RR is calculated from said map based on the intake amount obtained via the airflow meter 35 and the engine speed obtained via the engine speed sensor 33. In the exemplary embodiment, the high-low octane fuel supply ratio is defined as the ratio of high octane fuel quantity to the entire fuel quantity and represented in percentage. Needless to mention, the high-low octane fuel supply ratio may instead be defined as the ratio of low octane fuel quantity to the entire fuel quantity.

Next, the ECU 30 calculates an ignition timing AI in Step 203. The value of the ignition timing AI is found in advance by experiments with respect to the high-low octane fuel supply ratio RR, engine speed, and engine load, and is preliminarily stored in the ROM of the ECU 30 in the form of a three-dimensional map using RR, engine speed, and engine load as parameters. Thus, in Step 203, the ignition timing AI is calculated from this map.

Subsequently, in Step 205, the ECU 30 calculates the present value of remaining fuel quantity ratio RF which is the ratio between high octane fuel remaining quantity Vh indicating the fuel quantity in the fuel tank 11H and obtained via the fuel quantity sensor 12H and low octane fuel remaining quantity Vl indicating the fuel quantity in the fuel tank 11L and obtained via the fuel quantity sensor 12L (RF=Vh/Vl).

Next, ignition timing correction amounts Aad, Ard, and fuel supply ratio correction amounts Rhg, Rlw, which will be explained later, are cleared in Step 207.

Subsequently, in Step 209, the ECU 30 determines based on the knocking intensity detected via the knock sensor 37 whether a knocking is occurring, and thus whether the retarding of the ignition timing is necessary.

If "YES" in Step 209, the ECU 30 proceeds to Step 211 and determines based on the remaining fuel quantity ratio RF whether an unbalanced fuel quantity state in which the remaining quantity of high octane fuel is larger than low octane by a prescribed amount or more fuel has been caused.

In Step 211, more specifically, the ECU 30 determines if RF is greater than RF1, in order to judge if the aforementioned unbalanced fuel quantity state has been caused as a result of the remaining quantity of high octane fuel becoming larger than low octane fuel. RF1 is set larger than RFt, a target remaining fuel ratio, by margin α (RF1=RFt+α).

If "YES" in Step 211 (RF>RF1), it indicates that the retarding of the ignition timing is necessary (as judged in Step 209), and the unbalanced fuel quantity state has been caused. This is the case permitting improving the balance of the remaining high and low octane fuels by increasing the supply quantity of high octane fuel, as an alternative to the retarding of the ignition timing.

In this case, therefore, the ECU 30 proceeds to Step 215 and calculates an increase correction amount Rhg used for increase correction of the high-low octane fuel supply ratio. Rhg is found in advance and preliminarily stored in the ROM of the ECU 30 in the form of a one-dimensional map using the knocking intensity detected via the knock sensor 37 as a parameter. Thus, in Step 215, Rhg is calculated from the map in accordance with the knocking intensity.

If "NO" in Step 211 (RF≦RF1), conversely, it is considered that the remaining fuel quantity ratio is substantially equal to a target value and the aforementioned unbalanced fuel state has not been caused. Therefore, the ECU 30 proceeds to Step 213 and sets the ignition timing retard amount Ard. The value of Ard is determined in advance and is stored in the ROM of the ECU 30 in the form of a one-dimensional map using the knocking intensity detected via the knock sensor 37 as a parameter.

Back to Step 209, if it is determined in this step that there is no need to retard the ignition timing, the ECU 30 proceeds to Step 217 and determines whether the advancing of the ignition timing is required. In this exemplary embodiment, the ignition timing is set as close to an optimum ignition timing as possible, which is located near a limit region in which the possibility of a knocking is high. Thus, the advancing of the ignition timing is required as long as the knocking intensity detected by the knock sensor 37 is less than a lower limit value (which is set to a value much smaller than a driver can feel).

If "YES" in Step 217, the ECU 30 proceeds to Step 219 and determines whether RF is less than RF2 to judge if the remaining fuel quantity has been unbalanced as a result of the remaining quantity of low octane fuel becoming smaller than high octane fuel. RF2 is set smaller than RFt by margin a (RF1=RFt−α).

If "YES" in Step 219, it indicates that the advancing of the ignition timing is required (as judged in Step 217), and an unbalanced fuel quantity state in which the remaining quantity of high octane fuel is smaller than low octane fuel has been caused. This is the case permitting improving the balance of the remaining quantity of high and low octane fuels by increasing the supply ratio of low octane fuel quantity (and relatively reducing the supply ratio of high octane fuel), as an alternative to advancing the ignition timing. In this case, therefore, the ECU 30 proceeds to Step 223 and calculates an decrease correction amount Rlw used for decrease correction of the high-low octane fuel supply ratio, based on the knocking intensity detected via the knock sensor 37.

If "NO" in Step 219 (RF≧RF2), conversely, it is not necessary to increase the supply ratio of low octane fuel, and accordingly the ECU 30 proceeds to Step 221 and sets the ignition timing advance amount Aad based on the knocking intensity detected via the knock sensor 37. Back to Step 217, if determined "NO" in this step, the ECU 30 proceeds to Step 255. At this time, Step 255 is executed using Rhg, Rlw, Ard, and Aad, as all cleared in Step 207.

In Step 225, the ECU 30 calculates a final fuel supply ratio RRfin on the basis of the following equation;

$$RRfin=RR+Rhg-Rlw$$

and in step 227, the ECU 30 calculates a final ignition timing AIfin on the basis of the following equation;

$$AIfin=AI+Aad-Ard$$

where only one of Rhg, Rlw, Ard, and Aad has a positive value as a result of Step 217 or 219 determined "YES" (the ignition timing should be either retarded or advanced) while the other three remain zero after cleared in Step 207. Thus, only one of the fuel supply ratio and ignition timing is changed through Steps 225, 227.

If determined "NO" both in Steps 209 and 217, it indicates that it is not necessary to change the ignition timing. In this case, Rhg, Rlw, Ard, and Aad cleared in Step 207 are maintained, and therefore, RRfin becomes equal to RR calculated in Step 201, and AIfin becomes equal to AI calculated in Step 203, respectively.

Accordingly, by executing the routine of FIG. 2, it is possible to improve the balance of the remaining fuel quantity while preventing or stopping a knocking when the ignition timing is to be either retarded or advanced.

Next, a modified form of the routine of FIG. 2 will be described with reference to FIG. 3. In the FIG. 2 routine, the increase correction amount Rhg and decrease correction amount Rlw are calculated based on the knocking intensity in Steps 215, 223, and the high-low octane fuel supply ratio is changed by Rhg or Rlw.

However, the increase and decrease of the fuel supply ratio are limited, that is, it is impossible to increase the fuel supply ratio above 100%, and decrease same below 0% even if it is required to satisfy the calculated increase or decrease correction amount.

To counter this, the ECU 30 determines, after Rhg or Rlw has been calculated, whether it is possible to increase or decrease the fuel supply ratio by the calculated correction amount Rhg or Rlw, and If "NO", the ECU 30 changes the high-low octane fuel ratio as much as possible, and supplementally retards or advances the ignition timing by an amount needed to compensate for the excess increase or decrease correction amount. This enhances the reliability in preventing or stopping a knocking as well as improving the balance of the fuel supply ratio.

Figure 3:
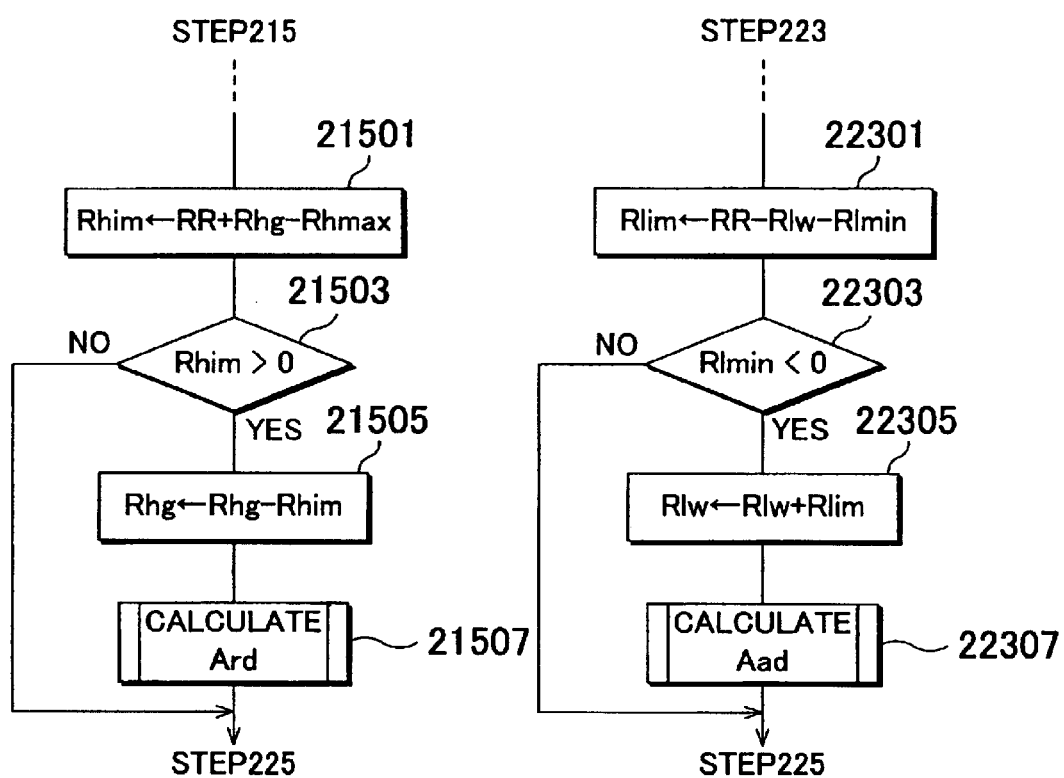
FIG. 3 is a flowchart representing another exemplary routine executed to control a knocking in the internal combustion engine shown in FIG. 1.

FIG. 3 shows one exemplary procedure to implement the above control. Steps 21505 to 21507 are inserted between Steps 215 and 225 of the FIG. 2 routine, and Steps 22301 to 22307 are inserted between Steps 223 and 225.

Referring to FIG. 2, after Rhg has been determined in Step 215, the ECU 30 performs Step 21501 and calculates an insufficient increase amount Rhim on the basis of the following equation;

$$Rhim=RR+Rhg-Rhmax$$

where Rhmax represents an upper limit value of the fuel supply ratio of high octane fuel and is typically set to 100% (but may instead be set less than 100% according to other conditions).

The value of Rhim obtained in Step 21501 represents the amount by which the fuel supply ratio of high octane fuel will exceed Rhmax. Since the high-low octane fuel supply ratio is unable to be increased beyond Rhmax, Rhim represents an insufficiency of the supply ratio of high octane fuel to achieve the required increase correction amount Rhg.

Next, in Step 21503, it is determined whether Rhim has a positive value. If "NO", it indicates that the fuel supply ratio will not exceed Rhmax when increased by Rhg, and therefore it is possible to increase the fuel supply ratio by Rhg. In this case, the ECU 30 proceeds to Step 225 (FIG. 2) and calculates RRfin.

If determined "YES" in Step 21503 (Rhim>0), conversely, it indicates that the fuel supply ratio will exceed Rhmax when increased by Rhg. In this case, the ECU 30 proceeds to Step 21505 and subtract Rhim from Rhg so that RRfin will be equal to Rhmax in Step 225.

However, subtracting Rhim from Rhg results in the octane rating of the entire fuel being less than a required level by an amount corresponding to Rhim. Therefore, the ECU 30 sets the ignition timing retard amount Ard to a value needed to compensate for the insufficient octane rating in Step 21507.

The relationship between Rhim and Ard is found in advance and stored in the ROM of the ECU 30 in the form of a one dimensional map using Rhim as a parameter. Thus, in Step 21507, Ard is determined from this map based on Rhim.

Accordingly, due to Steps 21505 and 21507 described above, the routine retards the ignition timing as determined in Step 227, as well as setting the fuel supply ratio equal to Rhmax in Step 225.

Meanwhile, Steps 22301 to 22307 are performed when decreasing the fuel supply ratio. Referring to FIG. 2, after Rlw has been determined in Step 223, the ECU 30 performs step S22301 and calculates an excess decrease amount Rlim on the basis of the following equation;

$$Rlim=RR-Rlw-Rlmin$$

where Rlmin represents a lower limit value of the fuel supply ratio below which the fuel supply ratio is not able to be reduced, and is typically set to 0% (but may instead be set more than 0% according to other conditions).

The value of Rlim obtained in Step 22301 represents the amount by which the fuel supply ratio will decrease below Rlmin. Since the fuel supply ratio is unable to be reduced below Rlmin, Rlim represents an insufficiency of the supply ratio of high octane fuel to achieve the required decrease correction amount Rlw.

Next, in Step 22303, it is determined whether Rlim has a negative value. If "NO", it indicates that the fuel supply ratio will not become less than Rlmin when decreased by Rlw, and therefore it is possible to reduce the fuel supply ratio by Rlim. In this case, the ECU 30 proceeds to Step 225 (FIG. 2) and calculates RRfin.

If determined "YES" in Step 22303, conversely, it indicates that the fuel supply ratio will become less than Rlmin when reduced by Rlw. In this case, the ECU 30 proceeds to Step 22305 and add Rlim to Rlw so that RRfin will be equal to Rlmin in Step 225.

However, adding Rlim to Rlw results in the octane rating of the entire fuel being greater than a required level by an amount corresponding to Rlim. Therefore, the ECU 30 sets the ignition timing advance amount Aad to a value needed to compensate for the excess octane rating in Step 22307.

The relationship between Rlim and Aad is found in advance and stored in the ROM of the ECU 30 in the form of a one dimensional map using Rlim as a parameter. Thus, in Step 22307, Aad is determined from this map based on Rlim.

Accordingly, due to Steps 22305 and 22307 described above, the routine advances the ignition timing as determined in Step 227, as well as setting the fuel supply ratio equal to Rlmin in Step 225.

Next, the setting procedure of the high-low octane fuel supply ratio will be described with reference to FIG. 4. In the routine shown in FIG. 2 (and FIG. 3), when it is determined that a knocking is occurring, the increasing of the supply ratio of high octane fuel or the retarding of the ignition timing is carried out.

The high-low octane fuel supply ratio, before changed in the routine of FIG. 2 (and FIG. 3), is determined based on engine speed and engine load, and the possibility of a knocking would rather depend on the rate of increase in the engine load than the absolute value thereof. That is, a knocking typically occurs in response to the engine load rapidly increasing, for example, when the vehicle is accelerating at a high rate. At this time, if the ECU 30 detects a knocking and retards the ignition timing accordingly, it reduces the engine output, resulting in deterioration of the engine performance.

Accordingly, in this exemplary embodiment, the ECU 30 increases the supply ratio of high octane fuel in advance according to the degree of acceleration requested by the driver (e.g., rate at which the driver depresses the accelerator pedal), in order to prevent a knocking which may otherwise be caused from a rapid increase in the engine load, and thereby prevent the ignition timing from being retarded largely.

Figure 4:
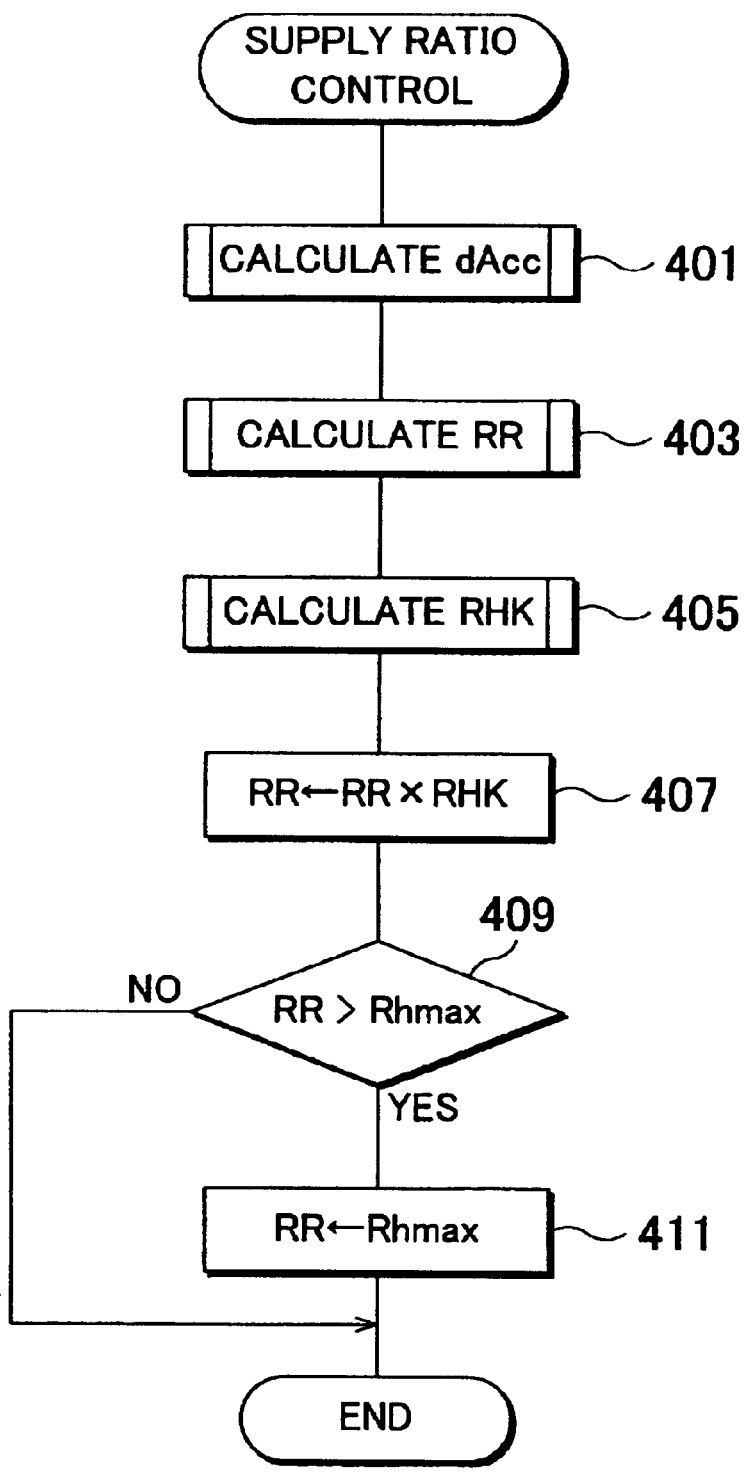
FIG. 4 is a flowchart representing one exemplary routine executed to control the fuel supply ratio in the internal combustion engine shown in FIG. 1.

FIG. 4 shows one exemplary routine that the ECU 30 executes at prescribed intervals to implement the above control of the high-low octane fuel supply ratio, independent of the routine of FIG. 2 (and FIG. 3). Referring to FIG. 4, the ECU 30 first obtains an accelerator opening change rate dAcc indicating the rate of increase in the engine load in Step 401 using the reading of an accelerator sensor, now shown, provided near the accelerator pedal. For example, dAcc is defined as an increased amount of the accelerator opening from the previous cycle of the routine.

Next, in Step 403, the ECU 30 calculates the high-low octane fuel supply ratio RR from the aforementioned two-dimensional map stored in the ROM of the ECU 30. In this step, the value of RR is set depending upon engine load and engine speed, irrespective of the rate of increase in the engine load. That is, RR is always set to the same value corresponding to a given combination of engine load and engine speed.

Subsequently, the ECU 30 proceeds to Step 405 and calculates an acceleration correction coefficient RHK as a function of dAcc such that RHK becomes 1 as long as dAcc is 0 or lower, while RHK increases as dAcc increases when dAcc has a positive value.

Next, in Step 407, the ECU 30 corrects RR by multiplying it with RHK obtained in the preceding step, so that the fuel supply ratio (KR) increases as the accelerator opening change rate (dAcc) increases. Further, the ECU 30 performs Steps 409 and 411 to limit the fuel supply ratio RR corrected in Step 407 below an upper limit value Rhmax.

Accordingly, in the routine of FIG. 4, since the supply ratio of high octane fuel is increased with an increase in the accelerator opening rate (i.e., required engine load), the ignition timing is not largely retarded and thus the engine performance does not deteriorate.

While the invention has been described with reference to preferred embodiments thereof, it is to be understood that the invention is not limited to the preferred embodiments or constructions. To the contrary, the invention is intended to cover various modifications and equivalent arrangements other than described above. In addition, while the various elements of the preferred embodiments are shown in various combinations and configurations, which are exemplary, other combinations and configurations, including more, less or only a single element, are also within the spirit and scope of the invention.

What is claimed is:

1. A knocking control system for an internal combustion engine, comprising:
   a fuel supply mechanism capable of supplying the internal combustion engine with a first fuel and a second fuel with a different octane rating from the first fuel, and
   a controller performing a knocking control to control a knocking occurring in the internal combustion engine, the controller being adapted to:
   obtain a requested ignition timing during the knocking control;
   obtain a remaining quantity of the first fuel and the second fuel; and
   select and change one of an ignition timing and a fuel supply ratio between the first and second fuels, the selection being made based on the requested ignition timing and the remaining quantity of the first and second fuels.

2. A knocking control system according to claim 1, wherein
   the controller is further adapted to change both the ignition timing and the supply ratio between the first and second fuels when a supply ratio of the first or second fuel is expected to exceed a predetermined ratio as a result of said fuel supply ratio being selected and changed.

3. A knocking control system according to claim 1, wherein
   the octane rating of the first fuel is higher than the octane rating of the second fuel, and
   the controller is further adapted to increase the supply ratio of the first fuel with an increase in a rate at which an accelerator opening is changed.

4. A knocking control system according to claim 2, wherein
   the predetermined ratio is 100%.

5. A method for performing a knocking control to control a knocking occurring in an internal combustion engine running on a first fuel and a second fuel with a different octane rating from the first fuel, the method comprising:

obtaining a requested ignition timing during the knocking control;

obtaining a remaining quantity of the first fuel and the second fuel; and selecting and changing one of an ignition timing and a fuel supply ratio between the first and second fuels, the selection being made based on the requested ignition timing and the remaining quantity of the first and second fuels.

6. A method according to claim 5, wherein the ignition timing and the supply ratio between the first and second fuels are both changed when a supply ratio of the first or second fuel is expected to exceed a predetermined ratio as a result of said fuel supply ratio being selected and changed.

7. A method according to claim 5, wherein the octane rating of the first fuel is higher than the octane rating of the second fuel, and the supply ratio of the first fuel is increased with an increase in a rate at which an accelerator opening is changed.

8. A method according to claim 6, wherein the predetermined ratio is 100%.

9. A knocking control system for an internal combustion engine, comprising:

fuel supply means for supplying the internal combustion engine with a first fuel and a second fuel with a different octane rating from the first fuel, and controlling means for performing a knocking control to control a knocking occurring in the internal combustion engine, wherein the control means;

obtains a requested ignition timing during the knocking control;

obtains a remaining quantity of the first fuel and the second fuel; and selects and changes one of an ignition timing and a fuel supply ratio between the first and second fuels, the selection being made based on the requested ignition timing and the remaining quantity of the first and second fuels.

* * * * *